United States Patent [19]

Chartrand

[11] Patent Number: 4,615,079
[45] Date of Patent: Oct. 7, 1986

[54] FISH CLEANER AND SCRAPER

[76] Inventor: Henry H. Chartrand, Star Route 1302-28, SM/C Rd., Sitka, Ak. 99835

[21] Appl. No.: 767,470

[22] Filed: Aug. 20, 1985

[51] Int. Cl.$^4$ ............................................. A22C 25/02
[52] U.S. Cl. .......................................... 17/66; 17/69; 17/58
[58] Field of Search ................. 17/66, 69, 58

[56] References Cited

U.S. PATENT DOCUMENTS

| 1,519,689 | 12/1924 | Maxson | 17/66 |
| 1,853,328 | 4/1932 | Youman | 17/58 |
| 1,900,267 | 3/1933 | Youman | 17/58 |
| 3,270,368 | 9/1966 | Cook, Sr. et al. | |
| 3,667,086 | 6/1972 | Sexton | 17/66 |
| 4,297,765 | 11/1981 | Altman et al. | 17/66 |

FOREIGN PATENT DOCUMENTS

| 622680 | 4/1981 | Switzerland | 17/66 |
| 416366 | 9/1934 | United Kingdom | 17/69 |

*Primary Examiner*—Willie G. Abercrombie
*Attorney, Agent, or Firm*—Henderson & Sturm

[57] ABSTRACT

A fish cleaning and scraping apparatus (10) for use in combination with a hose (13) connected to a source of pressurized water (14), wherein the apparatus (10) comprises an elongated hollow handle portion (11) connected on one end to the hose (13), and having a scraper blade portion (12) formed on its other end, wherein the scraper blade portion (12) comprises an elongated blade element (17) formed into a blade loop (19) which in turn forms elongated opposed ports for the pressurized water (14).

3 Claims, 6 Drawing Figures

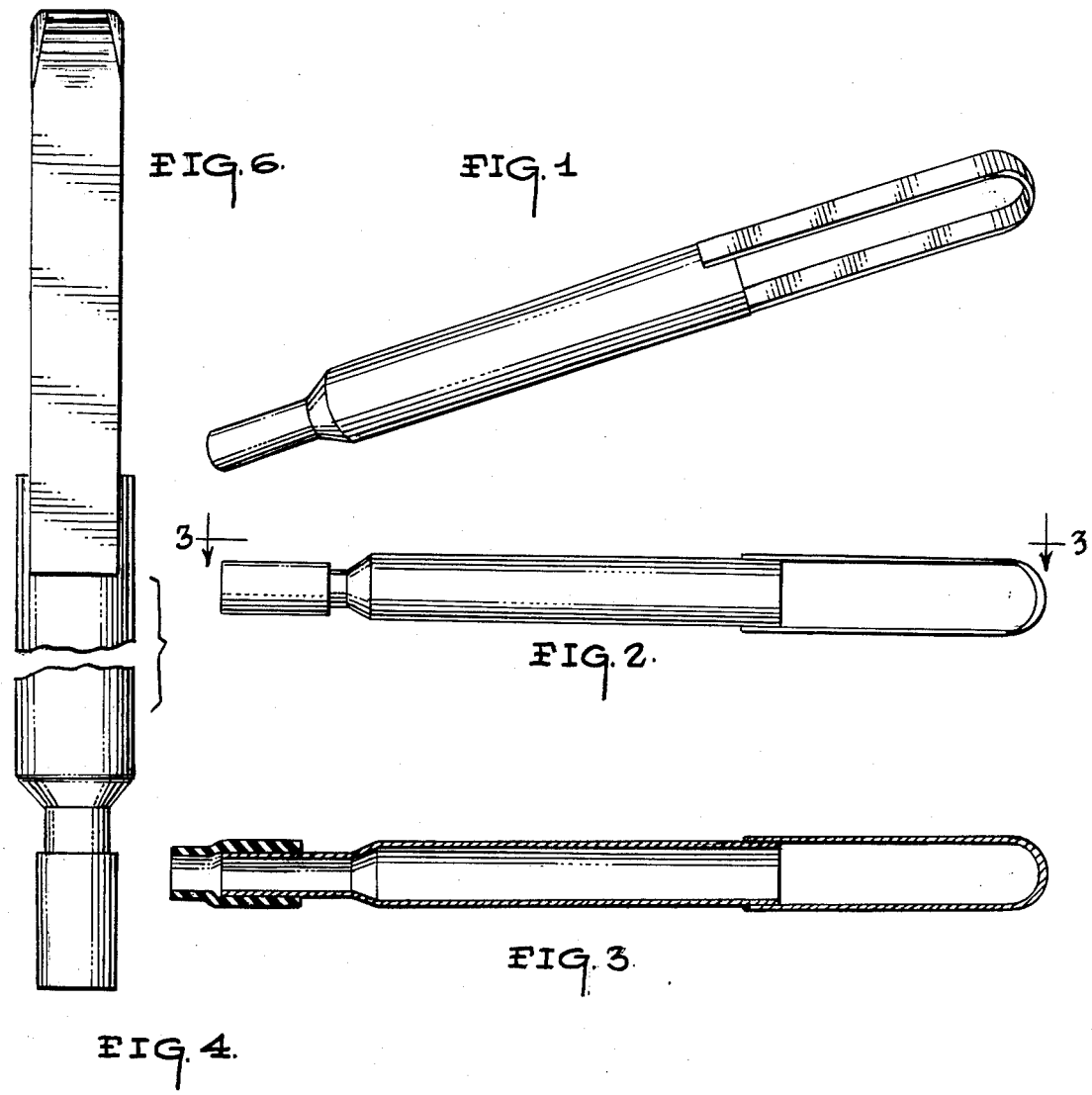
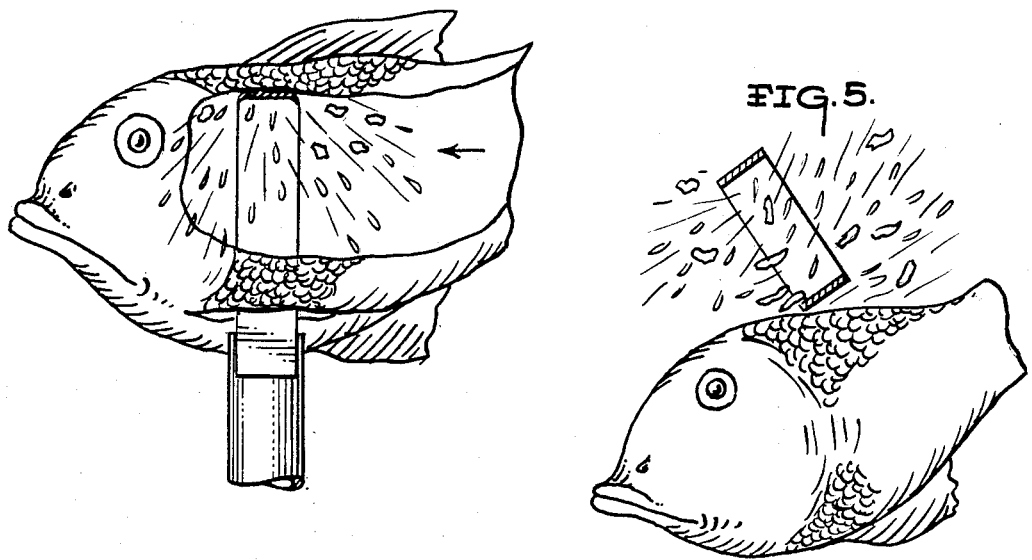

FISH CLEANER AND SCRAPER

TECHNICAL FIELD

The present, invention relates generally to the field of fish scaling and cleaning implements.

BACKGROUND OF THE INVENTION

The prior art is replete with diverse fish cleaning and scaling implements as can be seen by reference to U.S. Pat. Nos. 1,519,689; 3,270,368; 3,667,086; and 4,297,765.

As shown in the aforementioned prior art patents the vast majority of implements found in this area of technology are primarily concerned with and designed to facilitate the scaling of fish.

While these prior art structures are more than adequate for their intended purpose and function, they are uniformly deficient in their shortsighted approach regarding the cleaning of the entire fish including the body cavity.

Obviously, it is important to remove the scales of a fish as a preliminary step in the preparation of the fish; however, of even more importance is the thorough cleaning of the fish's body cavity.

Anyone even remotely familiar with the problems associated with the proper cleaning of fish, such as the occasional recreational angler, soon comes to the quick realization that even after a fish has been gutted, a certain amount of viscera will remain attached to the walls and crevices in the body cavity. Not only is this result unpleasant from an appearance standpoint, but more importantly this residue is particularly susceptible to spoilage that may ultimately taint the flesh of the fish.

Up until the development of the present invention, both commercial and recreational anglers had to improvise and employ implements that were neither designed nor intended for the removal of the body cavity viscera and residue. The end result of those efforts were, and continue to be, unpredictable, and soley dependent on the dexterity and skill of the individual users of the diverse implements.

SUMMARY OF THE INVENTION

The present invention while specifically designed both for the cleansing of the body cavity of fish and the removal of the neck meat from certain species of fish such as halibut and the like, can also be employed effectively as a scaling tool.

The present invention comprises in general a fish scraping and cleaning apparatus having an elongated hollow handle portion wherein one end of the hollow handle portion is dimensioned to frictionally engage the outlet of a hose which is connected to a source of water and, the other end of the hollow handle portion is provided with an elongated narrow scraper blade which forms a loop on the free end of the apparatus.

As will be described in greater detail further on in the specification, the dimensioning and configuration of the scraper blade not only allows the blade to remove and dislodge the body cavity residue but, once the viscera is even partially detached, the interior blade surface redirects pressurized water in a tangential fashion along the blade periphery to assist and enhance the scraping of the cavity walls and subsequently flush the dislodged particles therefrom.

The tangential impingement of the pressurized water along the blade interior surface also enhances the utilization of this implement as a descaling tool; in that the pressurized water tends to lift the individual scales a fraction of a second prior to the contact of the blade surface with the base of the scale at the point of attachment to the skIn of the fish.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein:

FIG. 1 is a perspective view of the scraping implement that forms the basis of this invention;

FIG. 2 is a side elevation view of the scraping implement;

FIG. 3 is a cross-sectional view of the scraping implement;

FIG. 4 is a detailed view of the scraping implement in contact with the body cavity of the fish;

FIG. 5 is a detailed view of the scraping implement in contact with the external scaled surface of the fish; and FIG. 6 is an enlarged perspective view of the scraping implement.

BEST MODE FOR CARRYING OUT THE INVENTION

As can best be seen by reference to FIG. 1, the cleaning and scraping apparatus that forms the basis of the present invention is designated generally by the reference numeral (10). The apparatus (10) comprises in general a handle portion (11) and a scraper blade portion (12), which combine to form an elongated narrow hand held cleaning implement for use in combination with a hose (13) connected to a source (not shown) of pressurized water (14). The respective portions of the hand held implement or apparatus (10) will now be described in seriatim fashion.

As is best depicted in FIGS. 1 and 3, the handle portion (11) comprises broadly, an elongated hollow cylindrical member (15), having a reduced diameter tubular extension (16) formed on one end wherein the reduced diameter extension (16) is dimensioned to frictionally engage the interior diameter (13') of a suitably dimensioned hose (13) connected to a source of pressurized water (14).

As can also be seen by reference to FIGS. 1 through 3, the scraper blade portion (12) of the implement (10) comprises an elongated, thin and relatively flat narrow blade element (17) that is joined to the enlarged end of the cylindrical handle member (15) via a reinforced transition portion (18). The blade element (17) is formed integrally with the transition portion (18) and the cylindrical handle member (15) so as to form an elongated closed loop (19) with respect thereto, wherein loop openings (19') forms elongated opposed ports for the pressurized water (14).

The major portion of the pressurized water (14) exiting from the hose (13) will impinge on the interior surface (17') of the blade element (17); and, in particular a substantial portion of the pressurized water (14) will impinge on the interior surface of the outboard end of the blade loop (19) resulting in a tangential dispersal of the pressurized water (14) along the periphery of the blade element (17).

The interior blade surfaces (17') of the blade element (17) tend to concentrate and enhance the peripheral and tangential dispersion of the pressurized water (14) along the blade edges as is best illustrated in FIGS. 4 and 5. When the apparatus (10) is disposed within the body cavity (101) of a fish (100), as depicted in FIG. 4, the pressurized water (14) is equally effective on both sides of the loop opening (19') to not only elevate the viscera ahead of the blade surface; but, also to flush the detached residue from the body cavity (101).

Referring to FIG. 5, wherein the implement (10) is used in the scaling mode, the peripheral dispersion of the pressurized water (14) is primarily effective along the trailing/scraping edge of the blade element (17). In this mode, the stream of pressurized water immediately ahead of the trailing blade surface will lift the free ends of the individual scales (102) upwardly and away from engagement with the skin (103) of the fish. This lifting action facilitates the severing contact of the blade surface with the base of the scales, to effect the detachment of the scales (102) from the skin (103). Once the scales have been detached, the turbulent pressurized water (14) within the area defined by the interior blade surface (17') will flush the scales (102) out through the loop openings (19').

It should also be appreciated at this point by reference to FIGS. 4 and 6, that the sharpened beveled edges 17" on the exterior surface of outboard curved end of the blade loop (19) are particularly well suited to accomplish the removal of the neck meat from certain species of fish, such as halibut and the like.

Having thereby described the subject matter of this invention, it should be obvious that many substitutions, modifications and variations of the invention are possible in light of the above teachings. It is therefore to be understood that the invention as taught and described herein is only to be limited to the extent of the breadth and scope of the appended claims.

I claim:

1. A hand held implement comprising a fish cleaning and scraping apparatus in combination with a hose connected to a source of pressurized water; wherein the apparatus consists of:
   a handle portion comprising an elongated hollow cylindrical member; having one end dimensioned to frictionally engage the outlet of said hose; and
   a scraper blade portion comprising an elongated thin and relatively narrow blade element connected to the other end of the said hollow cylindrical member, so as to form an elongated closed blade loop, wherein the blade loop openings form elongated opposed ports for the pressurized water.

2. A fish cleaning and scraping apparatus is dimensioned and aligned with respect to the handle portion as in claim 1; wherein the scraper blade portion such that the pressurized water will only exit through the elongated opposed ports formed by the blade loop openings.

3. A fish cleaning and scraping apparatus as in claim 2; wherein the outboard surfaces of the curved end of said blade loop are provided with sharpened beveled edges for the purpose of removing selected portions of meat from a fish.

* * * * *